US009176751B2

(12) United States Patent
Colelli et al.

(10) Patent No.: US 9,176,751 B2
(45) Date of Patent: Nov. 3, 2015

(54) TOOLS AND METHODS FOR CUSTOMIZING MULTI-FUNCTION DEVICES

(75) Inventors: Dianne Colelli, Webster, NY (US); Kristopher James Stasiw, Rochester, NY (US); Wendy Abbott, Rochester, NY (US); Linh La, Webster, NY (US); Kelvin Kwan, Rochester, NY (US); Boris Shmoys, Fairport, NY (US); Michael Trent, West Henrietta, NY (US); Jacob Woodworth, Canandaigua, NY (US); Stephen J. Sydorowicz, Macedon, NY (US); Khalid Rabb, Fairport, NY (US); Rick Born, Fairport, NY (US); Myriam Martinez, Rochester, NY (US); James Howell, Rochester, NY (US); Bernard R. Heroux, Jr., Webster, NY (US); David Mensing, Hilton, NY (US); Christine Miyachi, Andover, MA (US); Kenneth Schleede, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 122 days.

(21) Appl. No.: 13/439,180

(22) Filed: Apr. 4, 2012

(65) Prior Publication Data
US 2013/0268926 A1    Oct. 10, 2013

(51) Int. Cl.
*G06F 9/445* (2006.01)
*G06F 9/45* (2006.01)

(52) U.S. Cl.
CPC ....... *G06F 9/445* (2013.01); *G06F 8/40* (2013.01); *G06F 8/60* (2013.01)

(58) Field of Classification Search
CPC .............. G06F 9/445; G06F 8/60; G06F 8/40
See application file for complete search history.

(56) References Cited

U.S. PATENT DOCUMENTS

| 6,467,087 | B1* | 10/2002 | Yang ............................ 717/168 |
| 6,546,397 | B1* | 4/2003 | Rempell ............................. 1/1 |
| 7,227,656 | B1* | 6/2007 | Kato ............................ 358/1.15 |
| 7,246,348 | B1* | 7/2007 | Mixer, Jr. .................... 717/168 |
| 7,876,469 | B2* | 1/2011 | Hanada ........................ 717/174 |
| 8,243,306 | B2* | 8/2012 | Inoue ........................... 358/1.15 |
| 9,086,692 | B2* | 7/2015 | Nixon et al. ....................... 1/1 |
| 2002/0140966 | A1* | 10/2002 | Meade et al. ............... 358/1.15 |
| 2004/0012628 | A1 | 1/2004 | Kropf |

(Continued)

OTHER PUBLICATIONS

Nakazato et al., "Ubiquitous Printing Services", [Online] 2007, Oki Technical Review Apr. 2007 Issue 210 vol. 74 No. 2, [Retrieved from the Internet] <http://citeseerx.ist.psu.edu/viewdoc/download-?doi=10.1.1.89.4787&rep=rep1&type=pdf> pp. 62-65.*

(Continued)

*Primary Examiner* — Thuy Dao
*Assistant Examiner* — Ravi K Sinha

(57) ABSTRACT

Apparatus are provided that includes a multi-function device that is configured to perform a plurality of functions relating to manipulating a document. The multi-function device can have a display configured to display interface tool for facilitating the customization of a function of the multi-function device. The interface tools allow a user to communicate with the multi-function device to enter information relating to the customized function. The custom application can be configured to be installed on the multi-function device, and the custom application is used to customize the multi-function device.

18 Claims, 4 Drawing Sheets

(56) References Cited

U.S. PATENT DOCUMENTS

| | | | |
|---|---|---|---|
| 2004/0109188 A1* | 6/2004 | Akiyoshi et al. | 358/1.13 |
| 2005/0185055 A1* | 8/2005 | Miller et al. | 717/174 |
| 2007/0263243 A1* | 11/2007 | Matsugashita | 358/1.14 |
| 2007/0288903 A1* | 12/2007 | Manglik et al. | 717/124 |
| 2008/0080007 A1* | 4/2008 | Ueno et al. | 358/1.18 |
| 2008/0263230 A1* | 10/2008 | Mizuno et al. | 710/8 |
| 2010/0107152 A1* | 4/2010 | Kwon | 717/174 |
| 2010/0107153 A1* | 4/2010 | Kwon | 717/175 |
| 2010/0325609 A1* | 12/2010 | Windley et al. | 717/106 |
| 2011/0258595 A1* | 10/2011 | Clevenger | 717/106 |
| 2012/0084468 A1* | 4/2012 | Kitagawa | 710/16 |
| 2012/0137314 A1* | 5/2012 | Gribel | 719/328 |
| 2012/0140255 A1* | 6/2012 | Tanaka | 358/1.13 |
| 2012/0159310 A1* | 6/2012 | Chang et al. | 715/239 |
| 2012/0192174 A1* | 7/2012 | Tsuboi | 717/176 |
| 2012/0324057 A1* | 12/2012 | Macris | 709/219 |
| 2013/0063761 A1* | 3/2013 | Uchibori et al. | 358/1.14 |
| 2013/0227532 A1* | 8/2013 | Choi | 717/136 |

OTHER PUBLICATIONS

Rhodes et al., "Automatic Discovery and Execution of Personal Applications from Shared IO Devices," [Online] 2010, Consumer Communications and Networking Conference (CCNC), 7th IEEE Jan. 2010, [Retrieved from the Internet] <http://ieeexplore.ieee.org/stamp/stamp.jsp?tp=&arnumber=5421693&isnumber=5421566> 2 pages.*

Casey C. Rackley and Slade E. Griffin, Multifunction device security awareness, [Online] 2008, In Proceedings of the 5th annual conference on Information security curriculum development (InfoSecCD '08). ACM, New York, NY, USA, [Retrieved from the Internet] <http://doi.acm.org/10.1145/1456625.1456640 > pp. 51-55.*

* cited by examiner

TOOLS AND METHODS FOR CUSTOMIZING MULTI-FUNCTION DEVICES

FIELD OF THE DISCLOSURE

Aspects of the present disclosure relate to tools for customization of a multi-function device.

BACKGROUND

Computer users frequently access peripheral devices, such as, for example, multi-function devices. A multi-function device can be in the form of various devices, including a printer, scanner, or other type of device that can manipulate one or more documents. It may be desirable to add customized features to a multi-function device that allow a user to create custom features, for example, relating to the functionality of the multi-function device. Typically, the customization of a multi-function device is accomplished with the use of a separate server that is required to host the application used to customize the device. This can be problematic for users that do not have the capability to utilize a separate server, or for users that have multi-function devices that are not connected to a network.

SUMMARY

In accordance with one aspect of the present disclosure, apparatus are provided that include a multi-function device that is configured to perform a plurality of functions relating to manipulating a document. The multi-function device can have a display configured to display interface tools for facilitating the customization of a function of the multi-function device. The interface tools allow a user to communicate with the multi-function device to enter information relating to the customized function. The custom application can be configured to be installed on the multi-function device, and the custom application is used to customize the multi-function device.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Aspects of the disclosure are directed to a communication system for creating, installing, managing, and/or removing one or more custom applications on a multi-function device. The custom application is used to customize various aspects of a multi-function device, including but not limited to the functionality of the multi-function device and the aesthetics of the multi-function device. In one embodiment, the custom application is installed by directly interfacing with the multi-function device, such that no separate server external to the multi-function device is required for the installation.

A multi-function device can have various forms and include various features for manipulating one or more documents. For example, a multi-function device may be a printer, a device including a printer portion, a scanner, a device including a scanner portion, or a combination thereof. If the multi-function device is in the form of a printer, the printer may be a laser printer or an inkjet printer. The multi-function device may also include subsystems such as one or more paper trays, one or more finishing devices, and additional subsystems. The one or more finishing devices may include, for example, a stapler and a collator. The additional subsystems may include, for example, a halftoning mechanism, a two-sided printing mechanism, settings for two-sided printing, and a scaling function for scaling of printed documents. The additional subsystems may further include a manual feeder, and color and mono print output settings for the multi-function device.

Figure 1:
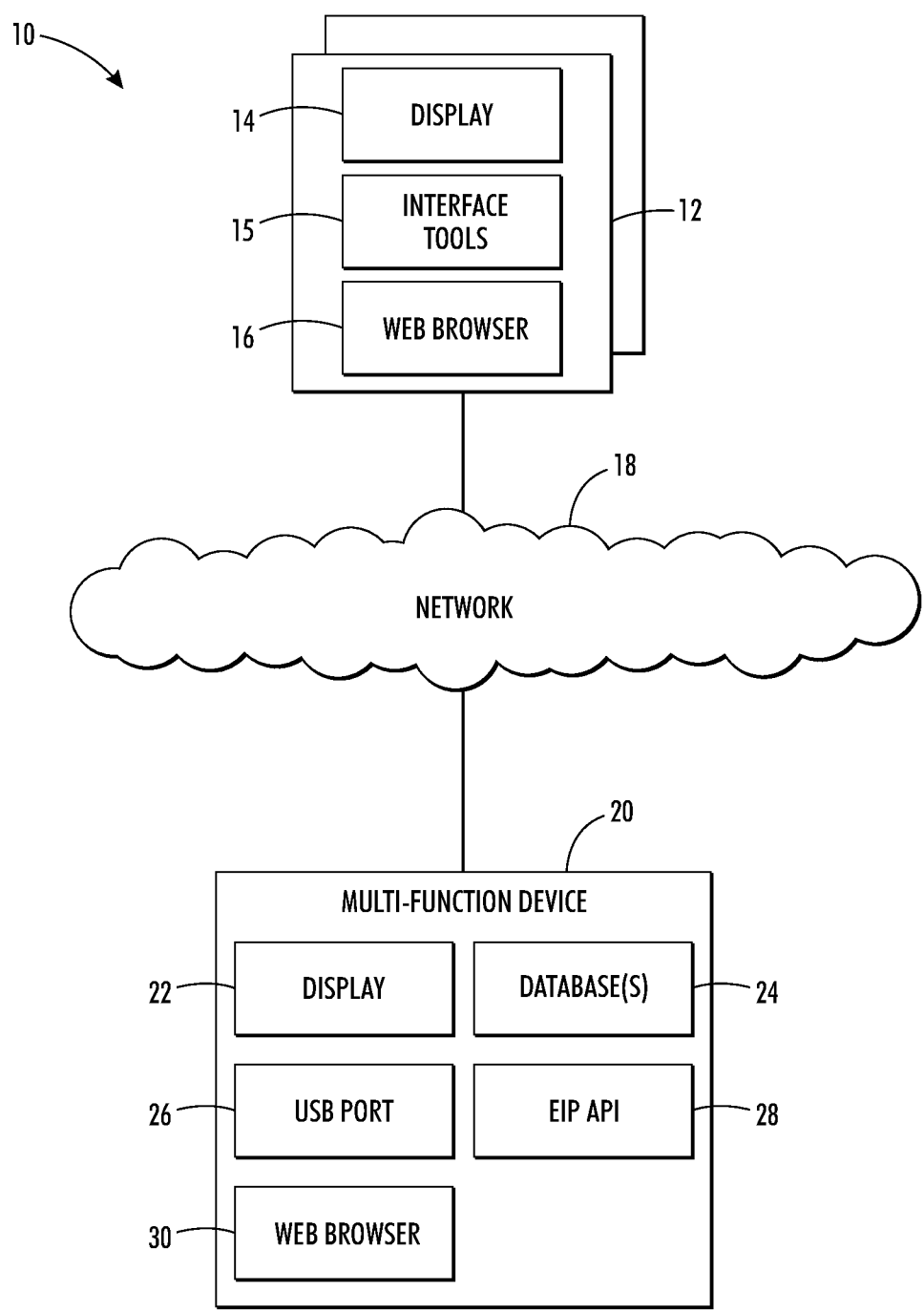
FIG. 1 is a block diagram of one embodiment of a communication system for creating and installing custom applications on one or more multi-function devices.

Referring now to the drawings in greater detail, FIG. 1 shows a block diagram of a communication system 10 that includes a data communication network 18 that is in communication with one or more data communications devices 12 configured to transmit and/or receive a variety of types of data and/or messages. For example, the data communications device 12 can be configured to create one or more custom applications and store the custom applications thereon for use in installing the custom applications on one or more multi-function devices 20, as will be discussed in more detail below. The data communications device 12 can have online access to the various components of the communication system 10 via an Internet browser, such as an Internet access application. The Internet access application can be configured to interface, for example, with the one or more multi-function devices 20 to allow the multi-function devices 20 to retrieve a custom application stored thereon. The Internet access application can be an application for a variety of devices, including a smartphone.

The one or more multi-function devices 20 are provided, and are configured to manipulate documents and install, manage, and/or remove custom applications thereon for customizing various features of the multi-function devices 20. A given multi-function device 20 includes a variety of features for manipulating a document, and also includes various components for installing the custom applications thereon. As illustrated in FIG. 1, in one embodiment the multi-function device can include a display 22 that is configured to display interface tools 15 for facilitating the customization of the multi-function device 20. The interface tools allow a user to communicate with the multi-function device 20 to enter information relating to the customized function and the installation, management, and/or removal thereof.

The multi-function device 20 can also include one or more databases 24 for storing information relating to, among other things, various custom applications installed thereon. The multi-function device 20 can also include various ports, such as a USB port 26, to allow a user to directly install a custom application from a memory device, such as USB, directly by inserting the memory device into the multi-function device 20 itself. The multi-function device 20 can also include a set of one or more interfaces, such as an Extensible Interface Platform (EIP), that can expose functionality of the multi-function device to allow a user to create customized workflows and their own interfaces for the multi-function device 20. An EIP programmable API 28 of the multi-function device can be configured to allow a user to create custom applications to be installed on the multi-function device 20 using the EIP API 28. The multi-function device can also include a web browser 30 that can communicate with other components of the communication system 10 using the network 18.

The custom applications for installation, management, and/or removal on the multi-function devices 20 can be used to customize various aspects of the multi-function devices 20. In one embodiment, the custom applications can be used to customize functionality of the multi-function device 20. For example, a custom application can be installed on a multi-function device 20 in order to customize the type of printing for certain types of documents. In another embodiment, one or more custom applications can be used to customize the aesthetics of the multi-function device 20. For example, a custom application can be used to change the look of the display 22 of the multi-function device, either for a specific set of users or for all users of the multi-function device 20. In other embodiment, one or more custom applications can be provided to customize any aspect of the multi-function device 20.

Figure 2:
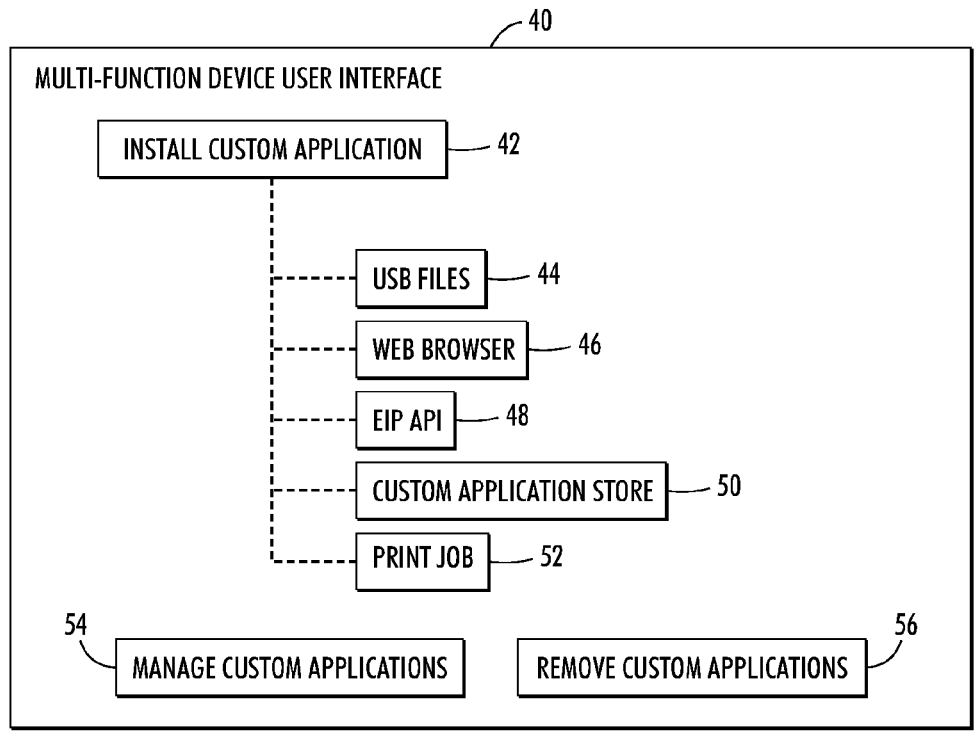
FIG. 2 is a functional schematic diagram of a screen or a window of a multi-function device in one embodiment of the disclosure.

A custom application can be installed, managed, and/or removed on a multi-function device in a variety of ways. In one embodiment, a user accesses the display 22 of the multi-function device 20 that is configured to display interface tools for facilitating the customization of the multi-function device 20. As illustrated in FIG. 2, the interface tools can include an install custom application tool 42 that allows the user to install a custom application. The install custom application tool 42 can allow the user to select the installation method from a variety of choices. The interface tools can also include a manage custom applications tool 54 that is configured to allow a user to view and manage the custom applications installed on the multi-function device, and a remove custom applications tool 56 that is configured to allow a user to view and remove a custom application installed on the multi-function device. For example, the tools 54, 56 can display a list of the currently-installed custom applications to a user, and allow the user to either manage or remove one or more of the listed custom applications.

In one embodiment, a custom application can be installed directly onto a multi-function device using a port of the multi-function device. For example, as explained above, the multi-function device 20 can include one or more USB ports 26 to allow a USB drive containing a custom application thereon to be inserted into the USB port 26 of the multi-function device 20. This allows the custom application to be installed directly onto the multi-function device 20 by allowing a user to access the custom application directly from the USB device. The user can access the install custom application tool 42 on the display of the multi-function device and select the USB Files option 44 to install the custom application form a USB device inserted into a port of the multi-function device. This allows the user to navigate to a list of items stored on the USB device, and allows the user to select the custom application stored on the USB device for installation on the multi-function device. It will be appreciated that any type of port on the multi-function device can be used with any compatible memory device to allow a user to access a custom application stored on the memory device for installation on the multi-function device.

In another embodiment, a custom application can be installed by utilizing a web browser of the multi-function device. For example, as explained above, the multi-function device 20 can include a web browser that is configured to communicate with other components of the communication system 10 as the custom application is saved on a component of the system. The web browser of the multi-function device allows the multi-function device to retrieve the custom application from a remote location. A user can access the install custom application tool 42 on the display of the multi-function device and select the web browser option 46 to install the custom application using the web browser of the multi-function device. The web browser allows the user to navigate to a website using the network 18 of the communication system 10 where the custom application is located. The user can utilize the interface tools of the display 22 to select the custom application and install the custom application on the multi-function device 20. In another example, the data communication device 12 can utilized the web browser 16 thereon to communicate with the multi-function device 20 and install one or more custom applications on the multi-function device.

In another embodiment, a custom application can be installed using an EIP programmable API of the multi-function device. For example, as explained above, the multi-function device 20 can include an EIP API 28. The custom application can be installed using the EIP programmable API 28 of the multi-function device as it can be configured to allow a user to create custom applications to be installed on the multi-function device 20 using the EIP API 28. The user can access the install custom application tool 42 on the display of the multi-function device and select the EIP API option 48 to install the custom application using the EIP API 28.

In another embodiment, a custom application can be installed on a multi-function device from an application store accessible by the multi-function device. The user can access the install custom application tool 42 on the display of the multi-function device and select the custom application store option 50 to install the custom application from an application store accessible to the multi-function device. The application store can be accessible to the multi-function device remotely such that the multi-function device can utilize the web browser 30 to access the application store, or the application store can be local to the multi-function device using, for example, an EIP application store on the multi-function device. When the custom application store option 50 is selected by the user using the interface tools of the display 22, the embodiment may be configured such that the user has the ability to select from the custom application available in the application store using the interface tools and install the custom application on the multi-function device.

In another embodiment, a custom application can be installed on a multi-function device by sending a print job to the multi-function device where the "print job" is a command to the multi-function device to install the custom application. In one embodiment, the user can access the install custom application tool 42 on the display of the multi-function device and select the print job option 52 to install the custom application from a print job sent to the multi-function device, for example, from the data communication device 12. In another embodiment, the custom application sent to the multi-function device via a print job can be installed automatically upon receipt by the multi-function device as the multi-function device will receive the print job and recognize that it is a custom application sent for installation thereon. For example, the custom application can be installed using any native job submission method, including Ipr.

Figure 4:
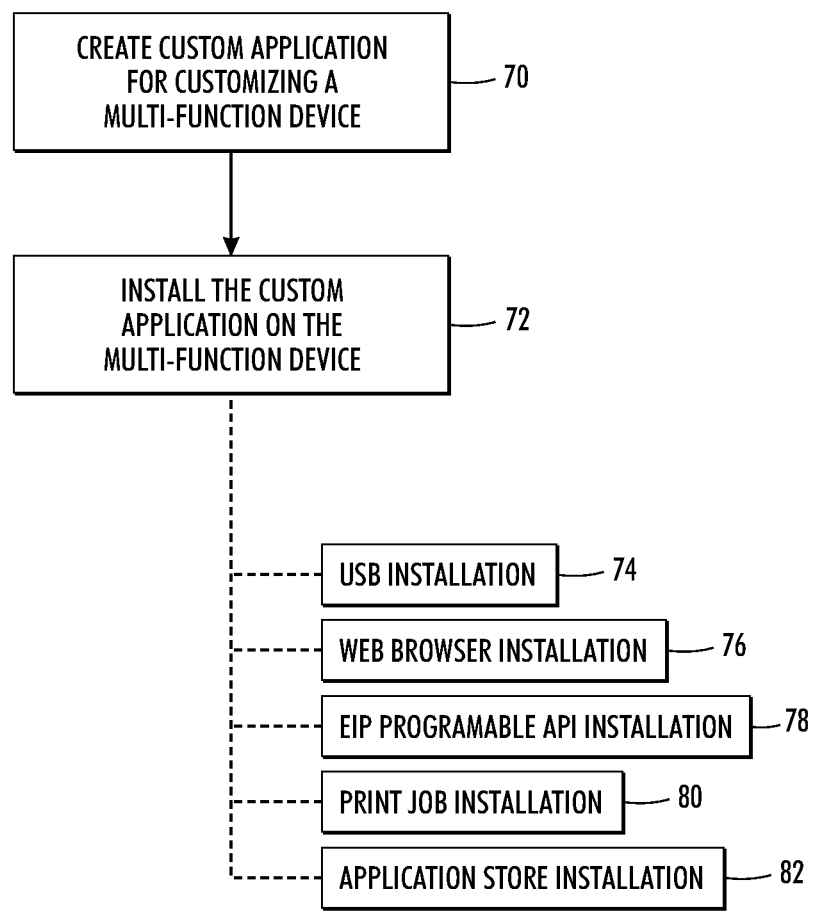
FIG. 4 is a flowchart of one embodiment of a process for creating and installing a custom application on a multi-function device.

FIG. 4 shows a flowchart of processes that allows a custom application to be created and/or installed on a multi-function device. The illustrated processes are carried out, in the illustrated embodiment, by the communication system 10 shown in FIG. 1. In act 70, a custom application is created for customizing a multi-function device, as will be discussed in more detail below. In act 72, the custom application is installed on the multi-function device using a variety of techniques, including but not limited to a USB installation 74, a web browser installation 76, an EIP programmable API installation 78, a print job installation 80, and an application store installation 82. The custom applications can also be managed or removed from the multi-function device after installation.

Figure 3:
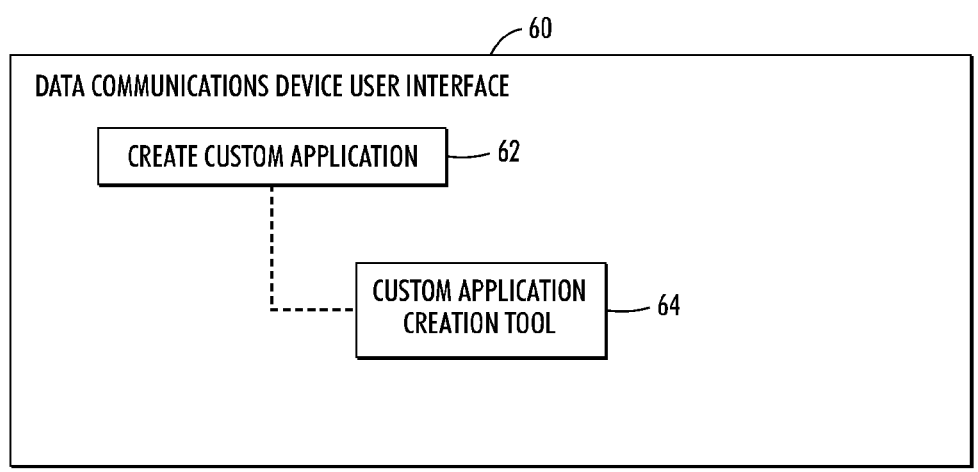
FIG. 3 is a functional schematic diagram of a screen or a window of a data communications device in one embodiment of the disclosure.
Figure 5:
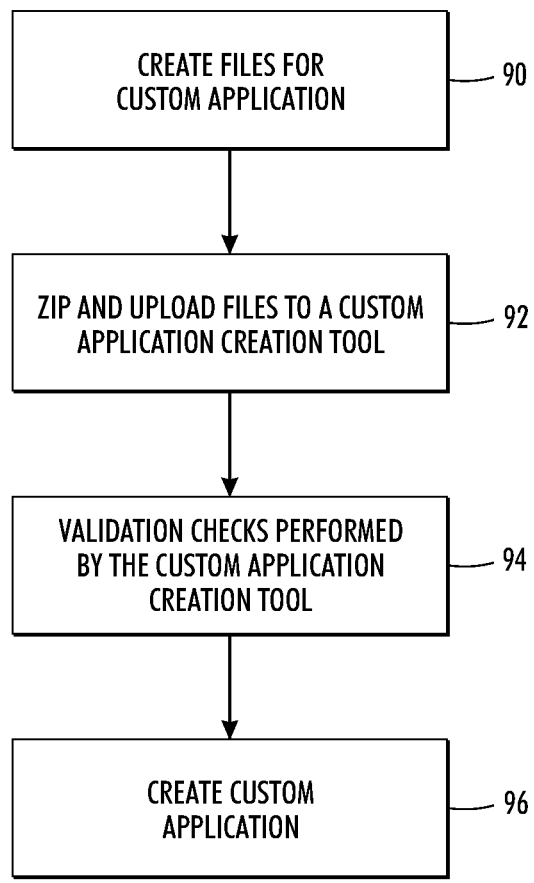
FIG. 5 is a flowchart of one embodiment of a process for creating a custom application for installation on a multi-function device.

There are a variety of methods for creating a custom application for installation of a multi-function device. In one embodiment, FIG. 5 flowchart illustrates a method of creating a custom application using a custom application creation tool. This tool allows a user to create a custom application, for example, using the data communications device 12. The display of the data communications device can be configured to display an interface, for example, as shown in FIG. 3, that presents one or more graphical tools allowing a user to create a custom application 62. For example, this presents the user with a custom application creation tool 64 to allow the user to create the application. In act 90 of FIG. 5, the user can then create the files that will be converted into the custom application. The files can be in a variety of formats, including HTML, CSS, and JavaScript. In act 92, the files for the custom application are zipped and uploaded to the custom application creation tool. In act 94, the custom application creation tool performs validation checks on the files. While the file validation can include a variety of checks, in one embodiment the validation of the files includes verifying that the file types are of an allowed type, verifying that the files are named according to a specific convention, and verifying that any required files are included. In act 96, after the files pass the validation step in act 94, the custom application is created from the files and made available for installation on a multi-function device.

Any given engine or tool referred to herein or any functionality referred to herein may be implemented with one or more processing circuits. For example, a processing circuit, or a processing mechanism, may include both (at least a portion of) computer-readable media carrying functional encoded data and components of an active computer. The active computer is ready to execute (or is already executing) the functional encoded data, and thereby causes certain acts to occur. A processing circuit may also include: a machine or part of a machine that is specially configured to carry out a process, e.g., any process described herein; or a special purpose computer or a part of a special purpose computer. A processing circuit may also be in the form of a general purpose computer running a compiled, interpretable, or compilable program (or part of such a program) that is combined with hardware carrying out a process or a set of processes. A processing circuit may further be implemented in the form of an application specific integrated circuit (ASIC), part of an ASIC, or a group of ASICs. A processing circuit may further include an electronic circuit or part of an electronic circuit. Neither a processing circuit nor a process mechanism exists in the form of code per se, software per se, instructions per se, mental thoughts alone, or processes that are carried out manually by a person without any involvement of a machine.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method, comprising:
   creating a plurality of files in a variety of different formats that are used for a custom application;
   zipping the plurality of files in the variety of different formats;
   uploading the plurality of files that is zipped to a custom application creation tool for performing file validation checks on the plurality of files, the checks including verifying that the plurality of files are of an allowed type, verifying that the plurality of files are named according to a specific convention, and verifying that the plurality of files include any required files, and further awaiting until after the plurality of files pass the file validation checks and then creating the custom application from the plurality of files in the variety of different formats and making the custom application available for installation, wherein the custom application causes customization of one or more aesthetics of a multi-function device, the one or more aesthetics including changing a look of a display of the multi-function device and customization of a type of printing for certain types of documents, wherein the custom application is made available in a custom application store accessible by an interface on the multi-function device; and
   installing the custom application on the multi-function device that is configured to manipulate one or more documents including printing, the custom application being installed on the multi-function device by directly interfacing with the multi-function device, the custom application being used to customize the multi-function device.

2. The method of claim 1, wherein no separate server external to the multi-function device is used to install the custom application thereon, and wherein the customization of the one or more aesthetics further includes changing the look of the display for a specific set of users of the multi-function device.

3. A system, comprising:
   a multi-function device comprising a processing circuit and associated memory configured to perform a plurality of functions relating to manipulating a document including printing, the multi-function device having a display configured to display at least one interface tool for facilitating a customization of a function of the multi-function device, the at least one interface tool allowing a user to communicate with the multi-function device to enter information relating to a customized function;
   an interface for receiving and installing a custom application on the multi-function device, the custom application being used to customize the multi-function device; and
   a customization engine comprising a custom application creation tool, wherein the customization engine allows the user to create files in a variety of different formats, to zip the files in the variety of different formats, and to upload the files that are zipped to the custom application creation tool, wherein the custom application creation tool performs file validation checks on files of the custom application, the file validation checks including verifying that files are of an allowed type, verification that the files are named according to a specific convention, and verification that the files include any required files, the customization engine further comprising a mechanism for awaiting until after the files pass the file validation checks and then creating the custom application from the files in the variety of different formats created by the user and making the custom application available for installation, wherein the customization of the multi-function device is based on the custom application and includes customization of one or more aesthetics of the multi-function device, the one or more aesthetics including changing a look of a display of the multi-function device and customization of a type of printing for certain types of documents, wherein the custom application is made available in a custom application store accessible by an interface on the multi-function device.

4. The system of claim 3, wherein the multi-function device is configured to print an image.

5. The system of claim 3, wherein the facilitating the customization of the function of the multi-function device includes initiating the installation of the customized function.

6. The system of claim 3, wherein the facilitating the customization of the function of the multi-function device includes controlling the installation of the customized function.

7. The system of claim 3, wherein the facilitating the customization of the function of the multi-function device includes updating a previously installed customized function.

8. The system of claim 3, wherein the facilitating the customization of the function of the multi-function device is the installation of a custom application thereon.

9. The system of claim 3, further comprising a data communication device configured to communicate information with the multi-function device regarding the custom application for installation thereon.

10. The system of claim 3, wherein the custom application is configured to be installed using a universal serial port (USB) port installation.

11. The system of claim 3, wherein the custom application is configured to be installed using a web browser installation that allows a web browser on the multi-function device to communicate with a remote data communication device to locate the custom application thereon.

12. The system of claim 11, wherein the remote data communication device includes a web browser configured to communicate with the multi-function device to install the custom application thereon.

13. The system of claim 3, wherein the custom application is configured to be installed using a print job installation, wherein the custom application transmitted in a communication to the multi-function device as a print job, the multi-function device determining that the communication is a custom application to be installed.

14. The system of claim 3, wherein the custom application is configured to be installed using an EIP (extensible interface platform) programmable API (application program interface) installation in which an EIP interface is used to create the custom application for installation on the multi-function device.

15. The system of claim 3, wherein the custom application is configured to be installed using an application store installation, wherein the custom application is selected from an the custom application store using an the interface on the multi-function device.

16. The system of claim 3, wherein the customization of the one or more aesthetics further includes changing the look of the display for a specific set of users of the multi-function device.

17. A non-transitory computer-readable medium encoded with data, the encoded data interoperable with a machine to cause the machine to perform operations, the operations comprising:
creating a plurality of files in a variety of different formats that are used for a custom application;
zipping the plurality of files in the variety of different formats;
uploading the plurality of files that is zipped to a custom application creation tool for performing file validation checks on the plurality of files, the checks including verifying that the plurality of files are of an allowed type, verifying that the plurality of files are named according to a specific convention, and verifying that the plurality of files include any required files, and further awaiting until after the plurality of files pass the file validation checks and then creating the custom application from the plurality of files in the variety of different formats and making the custom application available for installation, wherein the custom application causes customization of one or more aesthetics of a multi-function device, the one or more aesthetics including changing a look of a display of the multi-function device and customization of a type of printing for certain types of documents, wherein the custom application is made available in a custom application store accessible by an interface on the multi-function device; and
installing the custom application on the multi-function device that is configured to manipulate one or more documents including printing, the custom application being installed on the multi-function device by directly interfacing with the multi-function device, the custom application being used to customize the multi-function device.

18. The non-transitory computer-readable medium of claim 17, wherein no separate server external to the multi-function device is used to install the custom application thereon, and wherein the customization of the one or more aesthetics further includes changing the look of the display for a specific set of users of the multi-function device.

* * * * *